Dec. 23, 1969     H. A. HARRINGTON ET AL     3,485,230

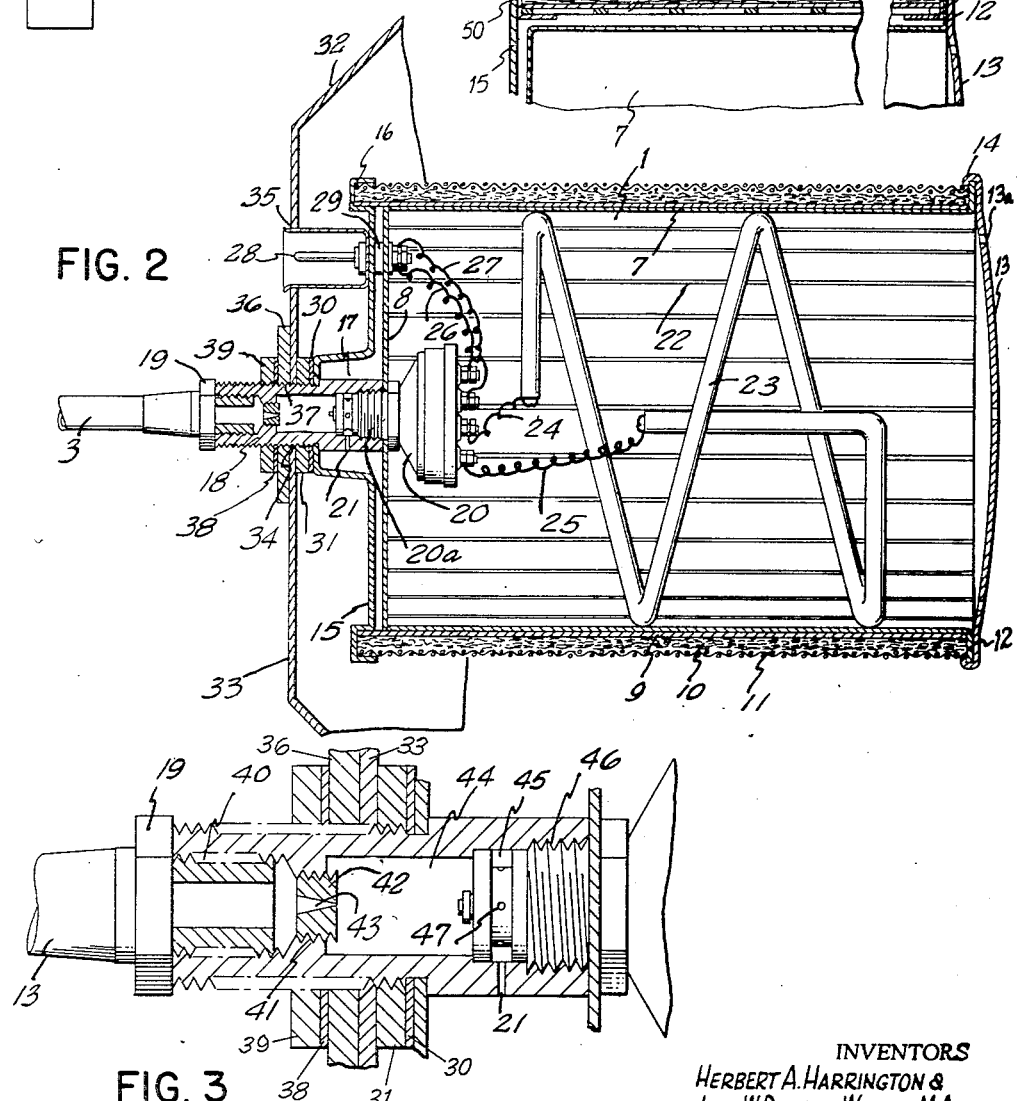

APPARATUS FOR CATALYTIC COMBUSTION

Filed March 6, 1967     8 Sheets-Sheet 2

INVENTORS
HERBERT A. HARRINGTON &
JOHN W. DICKEY & WILLIAM M. ALLEN &
CARL C. BUTZ & CLARENCE E. CAMPBELL,

BY MELVILLE, STRASSER, FOSTER & HOFFMAN

ATTORNEYS.

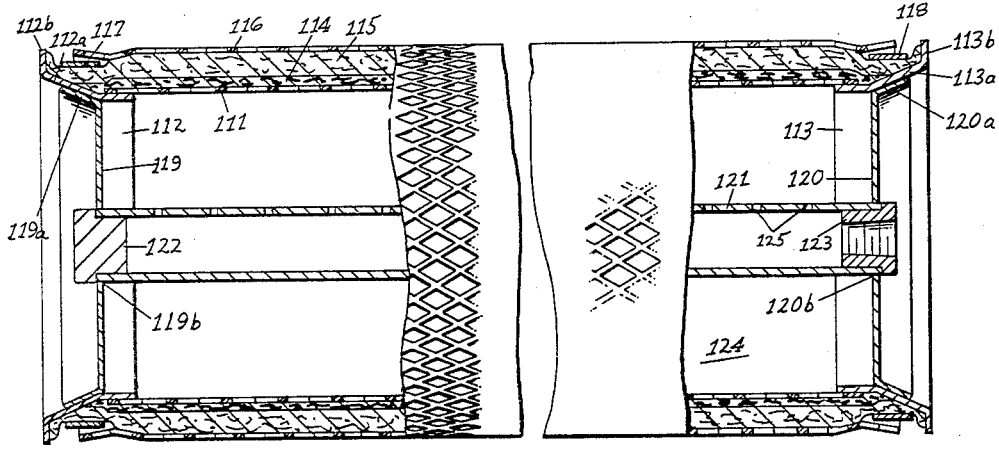
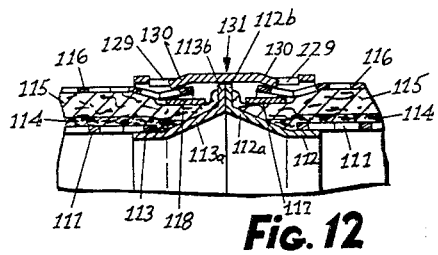
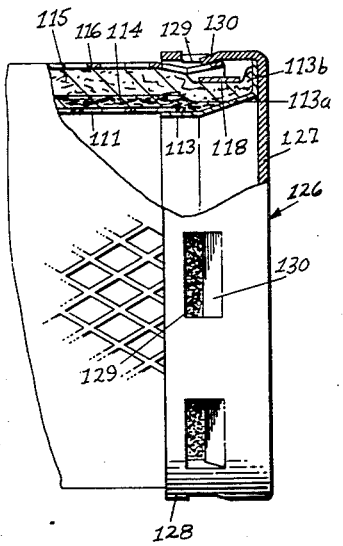
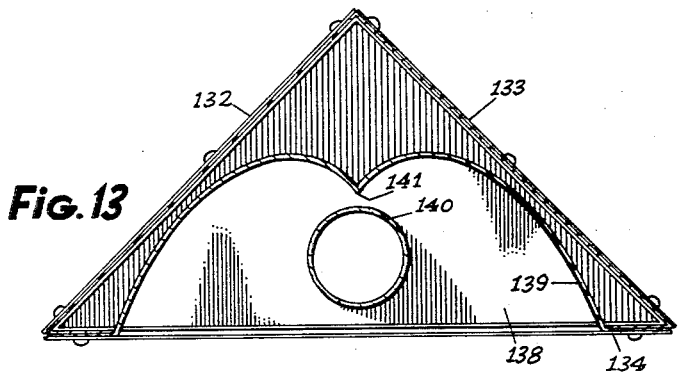
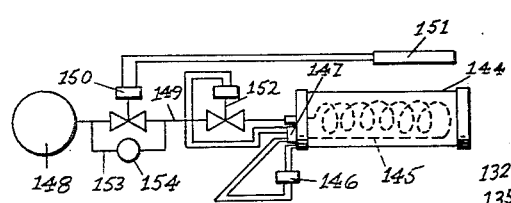
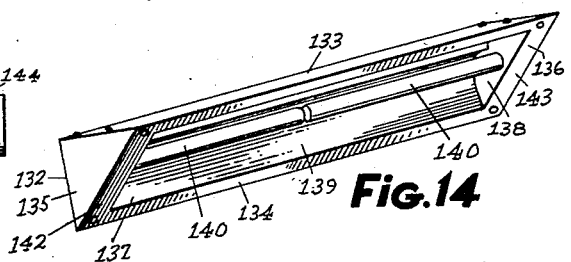

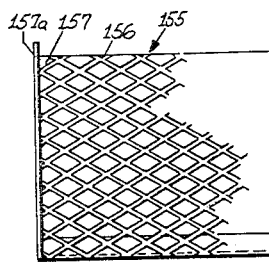
Fig. 16
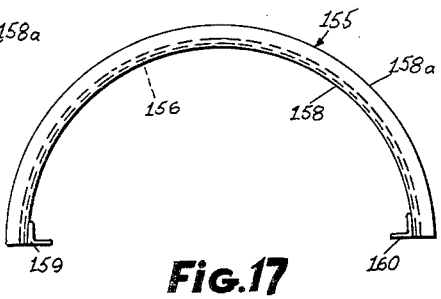
Fig. 17
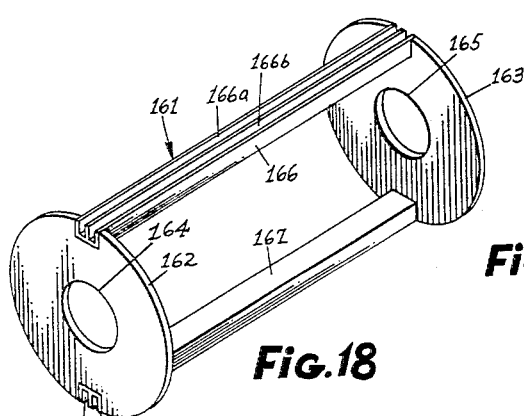
Fig. 18
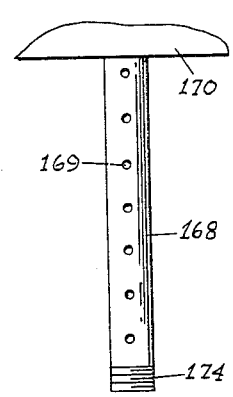
Fig. 19
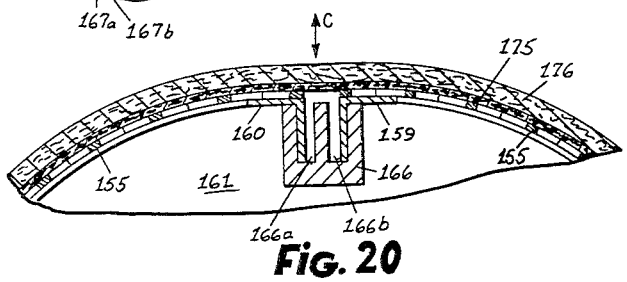
Fig. 20
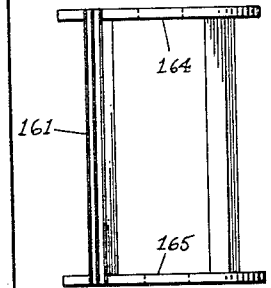
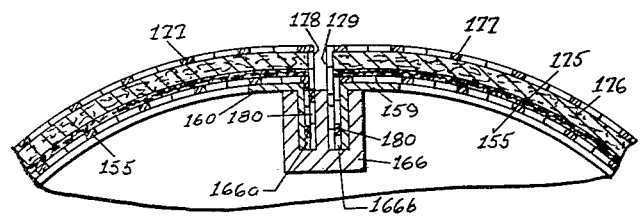
Fig. 21
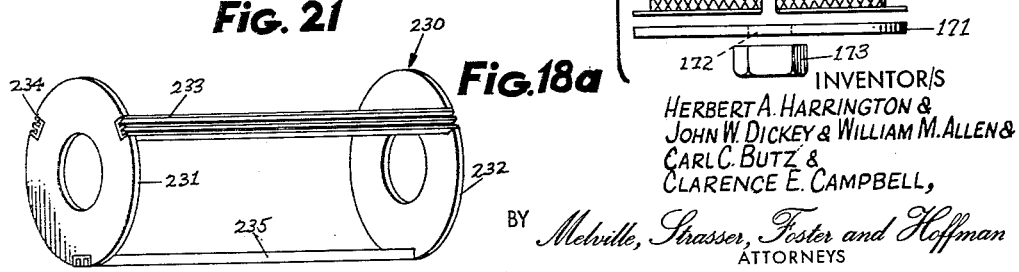
Fig. 18a
INVENTOR/S
HERBERT A. HARRINGTON &
JOHN W. DICKEY & WILLIAM M. ALLEN &
CARL C. BUTZ &
CLARENCE E. CAMPBELL,
BY *Melville, Strasser, Foster and Hoffman*
ATTORNEYS Dec. 23, 1969  H. A. HARRINGTON ET AL  3,485,230
APPARATUS FOR CATALYTIC COMBUSTION
Filed March 6, 1967  8 Sheets-Sheet 6

INVENTOR/S
HERBERT A. HARRINGTON &
JOHN W. DICKEY & WILLIAM M. ALLEN &
CARL C. BUTZ & CLARENCE E. CAMPBELL,
BY *Melville, Strasser, Foster and Hoffman*
ATTORNEYS

United States Patent Office 3,485,230
Patented Dec. 23, 1969

3,485,230
APPARATUS FOR CATALYTIC COMBUSTION
Herbert A. Harrington, Cincinnati, Ohio, John W. Dickey, Stanardsville, Va., William M. Allen, Cincinnati, Ohio, Carl C. Butz, Tipton, Ind., and Clarence E. Campbell, Fairfield, Ohio, assignors to Catalox Corporation, Tipton, Ind., a corporation of Indiana
Continuation-in-part of application Ser. No. 225,198, Sept. 21, 1962. This application Mar. 6, 1967, Ser. No. 621,060
Int. Cl. F24c *3/04;* F23d *13/14*
U.S. Cl. 126—92
34 Claims

ABSTRACT OF THE DISCLOSURE

Apparatus for the combustion of gaseous or vaporizable fuels under catalytic conditions having an air felted, fibrous, catalyst carrying bed and means for providing a uniform distribution of fuel flow to the catalyst bed.

CROSS REFERENCE TO RELATED APPLICATION

This application is a continuation-in-part of the copending application in the name of Herbert A. Harrington and John W. Dickey, Ser. No. 225,198, filed Sept. 21, 1962, entitled, "Apparatus for Catalytic Combustion and Method of Making It," now U.S. Patent No. 3,308,072, issued Mar. 7, 1967.

BACKGROUND OF THE INVENTION

Field of the invention

This invention relates to the combustion of gaseous or vaporizable fuels under catalytic conditions.

Description of the prior art

It is known that gaseous fuels may be burned by passing them through a pervious support for a catalyst into contact with oxygen from the surrounding atmosphere, and that the exothermic reaction will take place once the catalyst is heated to a threshold value. For example, heating devices have been made comprising a platinum-palladnum catalyst on a pervious carrier, such a fibrous asbestos, the catalyst and carrier, together with suitable supporting means forming one side of an otherwise closed chamber. In former structures of this type electrical heating elements have been imbedded in the catalyst carrier. If a suitable vaporizable fuel or a gaseous fuel such as natural gas, propane, or other gaseous substances having carbonaceous, hydro-carbon or hydrogen combustible values in them, is introduced into the closed chamber and caused to pass through the porous carrier in contact with the catalyst, and if the catalyst is heated to the aforesaid threshold temperature, combustion will start in the catalyst carrier, where the oxygen of the surrounding air reacts with the fuel.

The advantages of this type of combustion for the generation of heat are very great in many uses. The combustion and the temperature reached at the surface of the catalyst carrier can be very readily and exactly controlled by regulating the quantity of fuel passing through the apparatus. The combustion occurs without flaming and at a relatively low temperature such as 500° to 650° F., so that fire hazard is minimized. At the same time the combustion of carbonaceous or hydro-carbon fuels is complete, so that the products of combustion consist of water vapor and carbon dioxide. Carbon monoxide, if it exists in the fuel or is formed at any stage of the combustion process will be oxidized to carbon dioxide so that the apparatus is suitable for use as unvented space-heating means in enclosures occupied by animals or human beings.

The specific catalysts employed as well as the specific nature of the fuel media do not constitute limitations upon this invention. The invention will be described in exemplary embodiments such as those broadly outlined above.

Hitherto, however, a number of difficulties have been encountered in the manufacture and use of apparatus for catalytic combustion. One of these difficulties was encountered in connection with the catalyst support and catalyst bed. It was found that if a fibrous material such as asbestos, impregnated with a catalyst, was simply compressed in a space, channeling resulted. This channeling meant an uneven distribution of the fuel in the catalyst bed and often resulted in the leakage of fuel. Attempts to correct this led to the use of thicker and thicker layers of catalyst bearing substance. This practice was both uneconomical and inefficient. Such beds were also characterized by a limitation as to the amount of the fuel used and therefore the temperature to which the beds could be driven. Generally, at a temperature above 640° to 700° F. it was found that raw gas was being passed by the bed. It was further discovered that electrical heating elements imbedded in the catalyst layer were subject to extreme corrosion.

In accordance with the present invention, catalytic combustion devices are provided having improved, relatively thin fibrous catalyst beds, free of channeling. The catalyst beds are capable of being diluted with inert fiber without significant loss of capacity or efficiency. The catalytic combustion devices of the present invention are characterized by a greatly increased efficiency and a capability of reaching higher temperatures than hitherto possible without fuel leakage.

SUMMARY OF THE INVENTION

The invention relates to apparatus for the catalytic combustion of gaseous or vaporizable fuels. Gaseous or vaporized fuel is caused to pass through a catalyst carrying bed which has been brought to the threshold temperature of the catalytic reaction. An exothermic reaction takes place when the gaseous fuels are passed through the catalyst bed into contact with oxygen from the surrounding atmosphere.

While the nature of the catalyst material itself does not constitute a limitation on the present invention, the catalyst bed is made up of fibrous material such as asbestos or the like which has been treated with the catalyst material. Support means are provided onto which the catalyst bearing fibers are air felted while the support means is rotated in a closed chamber so that a layered bed of the type described below is formed. Diffuser means are provided to insure uniform distribution of the gaseous fuel flow to the catalyst bed. The diffuser means may comprise a sheet of suitably porous material and may even serve as the catalyst bed support. The diffuser means may also comprise a first layer in the bed of the same fibrous material from which the catalyst bed is made, but untreated with the catalyst itself.

Means are provided to insure an even flow of fuel to the entire surface of the diffuser means. Thermostatically controlled means may also be used to regulate the flow of fuel from the fuel source. In addition, an electrical heating element may be provided to bring the catalyst bed to the threshold temperature of the catalytic reaction.

In several of the embodiments described below, the catalyst bed is in a cylindrical configuration. In one embodiment, the catalyst bed has a flat rectangular configuration. In yet another embodiment, the bed has an arcuate cross-section of less than 360° transversely of its long axis. The various catalytic heating devices of the present invention may be provided with reflector means,

BRIEF DESCRIPTION OF THE DRAWINGS

FIGURE 1 is a diagrammatic representation of one embodiment of the catalytic heating apparatus of the invention.

FIGURE 2 is a cross-sectional view of the catalytic heating apparatus taken along the section line 2—2 of FIGURE 1.

FIGURE 3 is a cross-sectional view of the fuel valve and fittings therefor of FIGURE 2.

FIGURE 4 is a partial cross-sectional view of a modification of the apparatus of FIGURE 2.

FIGURE 10 is a fragmentary cross-sectional view of another embodiment of the catalytic heating device of the present invention.

FIGURE 11 illustrates an end cap for a heating device of the type shown in FIGURE 10.

FIGURE 12 shows means for joining heating devices of the type shown in FIGURE 10 in end-to-end relationship.

FIGURE 13 is a cross-sectional view of a reflector and housing for a heating device of the type shown in FIGURE 10.

FIGURE 14 is a perspective view of the reflector and housing of FIGURE 13.

FIGURE 15 is a diagrammatic representation of attendant apparatus for operating a catalytic heater of the type shown in FIGURES 10, 13 and 14.

FIGURE 16 is a side elevational view of a foraminous support for a semi-cylindrical catalyst bed.

FIGURE 17 is an end elevational view of the support of FIGURE 16.

FIGURE 18 is a perspective view of a carrier for supports of the type shown in FIGURES 16 and 17.

FIGURE 18a is a perspective view of a carrier similar to that of FIGURE 18 but adapted to carry three catalyst bed supports.

FIGURE 19 is an exploded view illustrating a carrier of the type shown in FIGURE 18, a pair of supports of the type shown in FIGURE 16 and cooperating parts of a machine for making the catalyst bed, similar to the machine shown in FIGURES 8 and 9.

FIGURE 20 is a fragmentary cross-sectional view illustrating the assembly of a carrier and supports with the catalyst bed deposited thereon.

FIGURE 21 is a fragmentary cross-sectional view similar to FIGURE 20 illustrating the catalyst retaining means in place.

DESCRIPTION OF THE PREFERRED EMBODIMENTS

Figure 7:
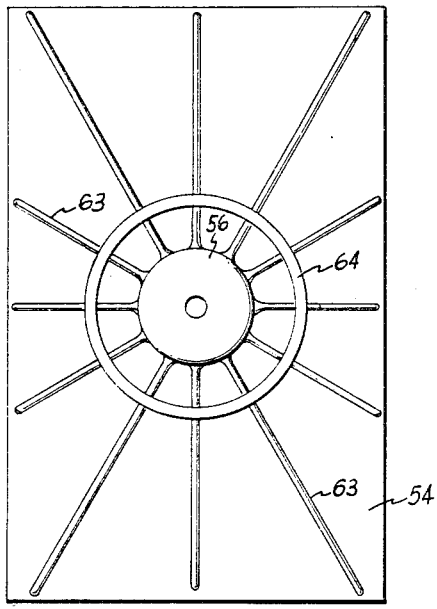
FIGURE 7 is a plan view of the under side of the device of FIGURE 5 with the outer casing removed.

FIGURE 1 is a diagrammatic representation of one embodiment of the present invention. The heating element 1 of the present invention may be provided with a reflector 2. The element 1 is connected by a conduit 3 to a suitable fuel source 4. The fuel source 4 may be a cylinder of any appropriate gaseous fuel such as natural gas, propane and the like. The cylinder has a main valve 5, and an additional pressure regulating valve 6 may be provided in the conduit 3 to reduce the gas pressure to a suitable level.

FIGURE 2 is an enlarged sectional view of the heating element 1. This element comprises an inner can 7 with a closed end 8, the other end being open. The exterior of the can 7 is surrounded by a diffuser sheet 9. The diffuser sheet 9 may be made of any suitable substance such as woven or unwoven asbestos or glass fiber. Next, a thin fibrous catalyst bed 10 rests on the diffuser sheet 9 and is held in place by a catalyst retainer 11. The porosity of the diffuser sheet is appreciably lower than that of the catalyst bed so as to build up a back pressure to insure uniform distribution of gaseous fuel flow to the catalyst bed. The catalyst retainer 11 may be made of any suitable heat resistant material. Preferably, it is characterized by at least 80% open area and a minimum blank-off contact with the catalyst surface. Aluminum clad steel screen or perforated aluminum sheet has been found suitable for this purpose. Stainless steel screen or perforated stainless steel sheet with a black oxidized finish for improved radiant efficiency may also be used.

The structure thus far described is cylindrical in configuration and is to be capped at both ends. At one end the can 7 is provided with an outwardly extending flange 12. A cap member 13 is provided with a circumferentially extending flange 14, substantially U-shaped in cross section. The flanges 12 and 14 cooperate to hold the cap 13 in place.

The other end of the structure is capped by means of the circular plate 15. The outermost edge 16 of the plate 15 is of U-shaped configuration to receive and retain in gas-tight fashion the diffuser sheet, catalyst bed, and catalyst retainer assembly. It will be noted that the plate 15 is spaced from the end 8 of the can 7 forming a gas receiving chamber generally indicated at 17.

Any suitable gas feed fitting 18 (more fully described hereinafter) may be provided and extends from the chamber 17 through a perforation in the plate 15. The fuel carrying conduit 3 is provided with a suitable fitting 19 which is threaded into the end of the gas feed fitting. A thermostatically actuated gas flow and heater control device 20 may be located within the can 7 with a portion 20a extending through a perforation in the end member 8 and threaded into that portion of the gas feed fitting 18 located in the chamber 17. The control device 20, when actuated, will cause the fuel or gas to be emitted through a perforation 21 in the fitting 18 into the chamber 17. In order to insure an even flow of gas to the entire surface of the diffuser sheet 9, the outside surface of the can 7 may be provided with a plurality of longitudinal channels or grooves 22. These channels communicate with the chamber 17 and may be narrow and shallow. The channels 21 may be made in the outside surface of the can 7 during or after its fabrication, and may even be scribed therein.

The interior of the can 7 is also provided with any suitable type of heating element. As shown in FIGURE 2, this element may take the form of a spiral or coiled element 23, the convolutions of which are of dimensions slightly greater than the interior diameter of the can itself. Thus when placed in position, the heating element retains its position by being sprung against the interior surface of the can. The heating element may be a metal sheathed Nichrome element. The element 23 is connected by leads 24 and 25 to the control device 20. The device 20 is in turn connected by leads 26 and 27 to an electrical plug-in assembly 28. It will be understood by one skilled in the art that such a plug-in terminal is especially desirable in a portable heating unit, but in a permanent installation may be replaced by a standard terminal box. Since the plug-in assembly 28 extends through perforations in the end 8 and the plate 15, a high temperature spacer and gasket 29 may be placed in the gas chamber 17 to seal these perforations. The cap 13 may be provided with holes 13a to accommodate the expansion of the air within the can 7 when the element 23 is operating.

As illustrated in FIGURES 2 and 3, a gasket 30 is placed on the fitting 18 and against the plate 15. This in turn is held in place by a jam nut 31. The embodiment illustrated in FIGURE 2 may be provided with a reflector. The reflector may be of any suitable configuration, and for purposes of an exemplary showing, a conical or parabolic reflector is illustrated in FIGURES 1 and 2 at 2 and 32, respectively. The reflector has a flat portion 33. The center of the portion 33 has a perforation 34 to enable the fitting 18 to pass through the reflector. The flat portion 33 may also be provided with an off-center perforation 35 enabling the electrical plug-in assembly to extend therethrough. A bracket or support member of any suitable configuration, generally indicated at 36, may be affixed to the reflector and provided with a hole 37 coaxial with the perforation 34. The reflector and bracket assembly is held in place on the fitting 18 by means of a lockwasher 38 and jam nut 39.

Exemplary forms of the gas feed fitting 18 and the gas flow and heater control device 20 are most clearly shown in FIGURE 3. The fitting 18 is provided at its intake end with an internally threaded perforation 40 to receive the fitting 19. The perforation 40 leads to a perforation 41 of reduced diameter into which is threaded an orifice set screw 42 having a tapered V-shaped slot 43. By adjusting the depth to which the set screw 42 is threaded into the perforation 41, the gas flow entering the passage 44 may be restricted. This adjustment may be made with the aid of a flow meter before assembly of the heating device. As will be understood by one skilled in the art, a fixed orifice may be used rather than the screw 42.

The passage 44 widens into a perforation 45 a part of which is internally threaded at 46 to receive the end 20a of the control device 20.

The device 20 may be any suitable temperature actuated switch and valve mechanism, and does not constitute a limitation on the present invention. For purposes of an exemplary showing, the device 20 is illustrated as the type employing a diaphragm which is depressed inwardly when the device reaches a certain temperature level. This diaphragm (not shown) when in depressed condition, serves not only to disconnect the heating element 23, but also to permit the flow of gas from the passage 44 through the holes 47 into the perforation 45. Thence, the gas will pass through the hole 21 in the fitting 18 into the chamber 17.

The operation of the embodiment of FIGURES 1, 2 and 3 is as follows. When a gas cylinder is used, the main valve 5 is opened allowing gas to pass through the conduit 3 and pressure regulating valve 6 into the fitting 18. Electrical connection is made with the plug-in terminal 28. This actuates the heating element 23, which in turn brings the catalyst bed 10 to its threshold temperature. The control device 20 is set to respond at this threshold temperature. Response by the control device 20 disconnects the heating element 23 and simultaneously opens the holes 47 allowing gas to flow into the chamber 17. The gas flows along the channels 22 and penetrates the diffuser sheet 9 into the catalyst bed 10. The exothermic reaction mentioned above takes place and the catalytic heating apparatus is then in full operation. The amount of heat given off may be varied by regulating the flow of gas. The device is turned off by shutting off the gas flow and breaking the electrical connection with the plug-in element 28.

A modification of the device of FIGURE 2 is illustrated in FIGURE 4. Like elements have like index numerals. The inner can 7 is provided at its open end with a flange 12. The plate 15 has a peripheral flange 48. A cylindrical support 49 is provided at either end with flanges 50 and 51. The support 49 is held in spaced relationship with respect to the can 7 (creating a gas passage) by means of flanges 50 and 51 abutting the plate 15 and the flange 12 respectively. The support 49 may be made of metal screen, or expanded aluminum or steel as illustrated. The support is surrounded by a diffuser sheet 9. The diffuser sheet will in turn be surrounded by a catalyst bed 10 and a catalyst retainer 11. The cap 13 is held in place by means of metal screws 52 passing through the cap and flanges 12 and 51.

It will be understood by one skilled in the art, that the support 49 and diffuser sheet 9 may be replaced by a rigid tube of glass or asbestos fiber serving both as a support and a diffuser. It will further be understood that the support 49 could be replaced by a thin layer of loose glass or asbestos fiber, which passes gas freely, wrapped about the can 7 and serving as a gas passing support between it and the diffuser sheet 9. It is also within the scope of the invention to replace the diffuser sheet 9 in FIGURE 4 with a layer of the same fibrous material of which the catalyst bed is made, this layer not having been impregnated with the catalyst material.

Figure 5:
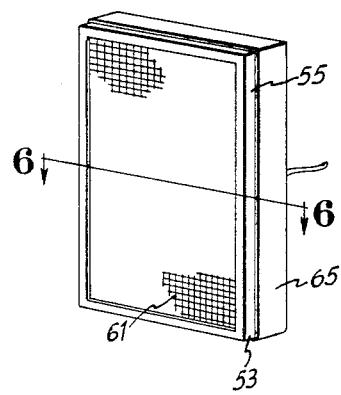
FIGURE 5 is a perspective view of another embodiment of the catalytic heating device of the present invention.
Figure 6:
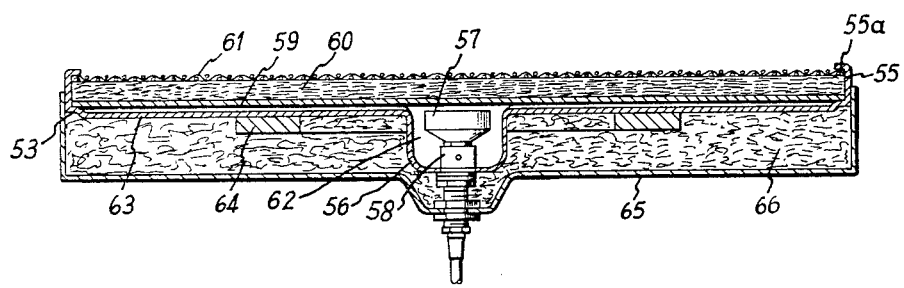
FIGURE 6 is a cross-sectional view of the apparatus of FIGURE 5 taken along the section line 6—6.

Another embodiment of the present invention is illustrated in FIGURES 5, 6 and 7. This embodiment comprises a flat pan-like support of high heat conducting metal generally indicated at 53. This support may be of any shape including square or rectangular as illustrated in FIGURES 5 through 7. The member 53 has a flat support area 54 and upturned edges 55. The member 53 is also provided with a centrally located depression 56. This depression houses a gas flow and heater control device 57 which may be similar to the control device 20 of FIGURE 2. The depression 56 also houses a gas feed fitting 57 which may be similar to the fitting 18 of FIGURE 2. A portion of the fitting 57 extends through a perforation 58 in the depression 56. A diffuser sheet 59 is laid directly on the support area 54, and in turn supports a catalyst bed 60 and a catalyst retainer 61. The elements 59, 60 and 61 correspond to the elements 9, 10 and 11 of FIGURE 2 The edges 55 may be provided with flanges 55a to hold the retainer 61 in place..

Gas in the chamber 62 formed by the depression 56 is led over the entire area of the diffuser sheet by means of longitudinal depressions or channels 63. These channels are formed in the support area 54 and extend radially from the chamber 62 In this instance a flat ring heater 64 may be employed located on the outside surface of the support member 53 The heater 64 is connected by suitable means not shown to an external source of electricity and to the control device 57

Referring to FIGURES 5 and 6 an outer casing or cover 65 may be provided to enclose the heating element 64. The space between the cover 65 and support 53 may be filled with asbestos or glass fibers generally indicated at 66.

The operation of the embodiment of FIGURES 5 through 7 is generally the same as that described with respect to the embodiment of FIGURES 1 through 3.

It is within the scope of the present invention to provide the bed of the embodiment of FIGURES 5 through 7 with a foraminous support similar to that shown at 49 in FIGURE 4 and to replace the diffuser sheet 59 with a layer of the same fibrous material of which the catalyst bed itself is made, this layer not having been impregnated with the catalyst material.

Figure 8:
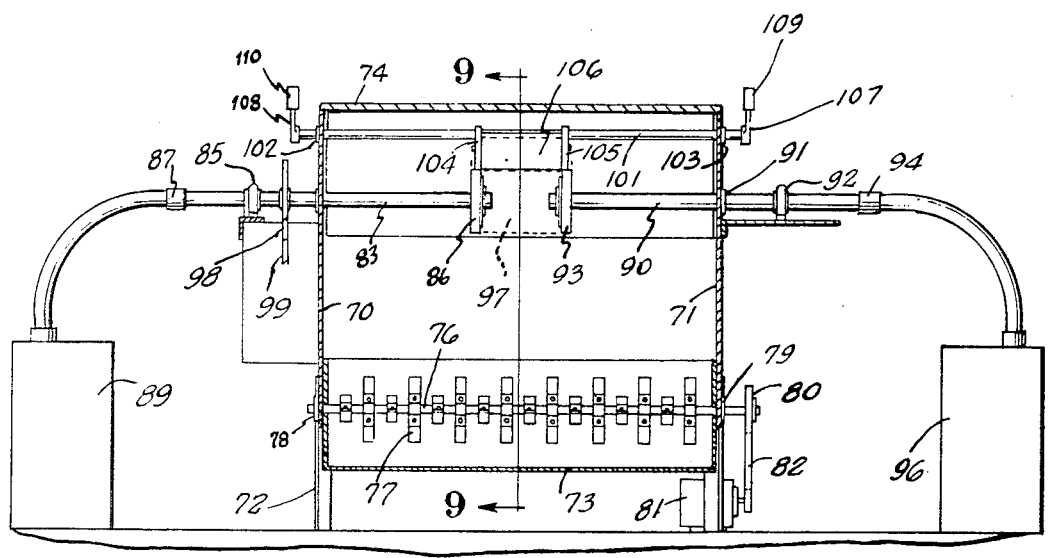
FIGURE 8 is an elevational view of the machine for making the improved fibrous catalyst beds.
Figure 9:
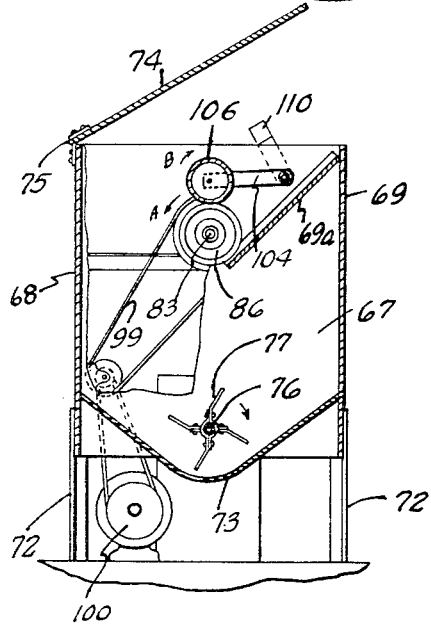
FIGURE 9 is a cross-sectional view of the machine of FIGURE 8 taken along the section line 9—9.

FIGURES 8 and 9 illustrate a machine for making the catalyst bed. The machine comprises a rectangular chamber 67 with a vertical back wall 68, a front wall 69, and end or side walls 70 and 71. The machine is mounted on suitable support members generally indicated at 72. The chamber 67 has a bottom 73 of U-shaped configuration. A top 74 is pivotally mounted to the back wall 68 by means of hinges 75. The top 74 may be provided with a window, or may be made entirely of clear plastic or the like so that the operation of the elements within the chamber 67 may be observed when the lid is in closed position.

A shaft 76 bearing a plurality of blades or beaters 77 is rotatively mounted in bearings 78 and 79 in end walls 70 and 71 respectively. The shaft 76 is so positioned that the blades 77 pass in close proximity to the lowermost portion of the U-shaped bottom member 73. Any suitable power source may be employed to cause the shaft 76 to rotate. As an exemplary showing, a portion of the shaft 76 may extend outside the end wall 71 and be provided with a pulley 80. The pulley 80 is in turn connected with a motor 81 by means of a belt 82.

A shaft 83 is rotatively mounted in a bearing 84 in the side wall 70 and a bearing 85 located outside of the chamber 67. The shaft 83 is adjustable axially within the bearings 84 and 85 and is capable of extending at least half way across the chamber 67. The end of the shaft 83 extending into the chamber 67 is provided with a circular abutment means 86. The shaft 83 is hollow and is rotatively connected outside the chamber 67 at 87 to a conduit 88 leading to a vacuum source 89. The vacuum source may be of any suitable type well known in the art. A second hollow shaft 90, coaxial with the shaft 83 and similar to it, is rotatively mounted in a bearing 91 in the sidewall 71 and a second bearing 92 outside the chamber 67. The shaft 90 is also provided with a circular abutment means 93 and a connection 94 to a conduit 95 leading to a vacuum source 96. The shaft 90 is also adjustable longitudinally within the bearings 90 and 92, and is capable of extending at least half way across the chamber 67. Thus, the abutment means 86 and 93 are coaxial and may be moved toward or away from each other.

The abutment means 86 and 93 are adapted to engage the end of a foraminous cylindrical member 97 shown in dotted lines and more fully described hereinafter. A pulley 98 is adjustably and non-rotatably affixed to the shaft 83 and is connected by means of a belt 99 to a power source 100. Thus, when the shaft 83 is caused to rotate in the direction of the arrow A, its rotation will be imparted to the shaft 90 through the foraminous cylindrical member 97.

A second shaft 101 is rotatively mounted in bearings 102 and 103 in side members 70 and 71, respectively. The portion of this shaft in the center of the chamber 67 bears arms 104 and 105. A cylindrical idler member 106 is removably and rotatively mounted between the arms 104 and 105 with its axis parallel to but not coaxial with the shaft 101. It will be noted from FIGURE 9, that when the idler 106 is in its lowermost position, it will rest against the foraminous cylinder 97. Either or both ends of the shaft 101 may be made to extend outside of the walls 70 and 71, and be provided at their ends with arms 107 and 108. The ends of these arms are provided with adjustable weights 109 and 110, respectively. It will be understood that these arm and weight assemblies will cause the idler member 106 to bear against the foraminous cylindrical member 97. It is preferable to provide an idler member of approximately the same length as the foraminous cylinder 97.

For purposes of an exemplary showing, the operation of the machine will be described with respect to the formation of a catalyst bed of the type required for the embodiment illustrated in FIGURE 2. A foraminous cylindrical member 97 of approximately the same diameter as the can 7 is placed and held firmly between the abutment means 86 and 93. An idler 106 of approximately the same length is also provided. The fibrous catalyst material, as for example platenized asbestos, is placed in the U-shaped bottom 73 of the machine. The foraminous cylinder 97 is provided with a diffuser sheet 9 wrapped thereabout. First, the shaft 76 with its blades 77 is caused to rotate at high speed. This results in a beating of the fibrous catalyst material causing it to be suspended in air within the chamber 67 in the form of small patches of fibers often referred to as "chicken feathers." Next the shafts 83 and 90 are caused to rotate resulting in the rotation of the foraminous cylindrical member 97 with the diffuser sheet thereon in the direction of the arrow A, and in turn causing the idler member 106 to rotate in the direction of the arrow B. Finally, the vacuum sources 89 and 96 are actuated causing a vacuum to be pulled within the foraminous cylinder 97. As a result, the suspended fibrous catalyst material in the form of "chicken feathers" is attracted to and forms a bed on the diffuser sheet. An inwardly and downwardly slanting baffle 69a may be affixed to the front wall 69 to aid in directing the air-suspended catalyst material toward the cylindrical member 97. The idler member 106 tends to pack the catalyst material, and when a bed of suitable thickness has been formed on the diffuser sheet the shaft 76 is stopped, the vacuum sources 89 and 96 are turned off, and finally shafts 83 and 90 are stopped. The cylindrical member 97 is removed from between the abutments 86 and 93 and the diffuser sheet and catalyst layer or bed are removed from the foraminous cylinder.

It will be understood that the support 49 of FIGURE 4 may be substituted for the foraminous cylinder 97 when making the embodiment of FIGURE 4. When the support 49 and diffuser sheet 9 are replaced by a rigid or semi-rigid cylindrical member of glass or asbestos fiber, these cylindrical members may be substituted for the foraminous member 97.

When making the catalyst bed illustrated in FIGURE 6 a foraminous cylinder 97 of suitable size is used. When the bed has been formed, it is removed from the foraminous cylinder and cut and flattened to form a flat catalyst bed.

Heretofore catalyst beds for catalytic heating devices have been characterized by non-uniformity and channeling. Attempts to overcome this led to increasing the thickness of the catalyst beds, and it was usual practice to make beds of a thickness of 1 to 1½ inches or more. In use such beds tended to pass raw gas upon reaching a temperature of 650° to 700° F. It has also been suggested that such beds be water felted.

Catalyst beds made by the air felting and vacuum deposition process outlined above have been found to possess remarkable characteristics. Unlike previous beds including water felted beds, the catalyst beds of the present invention have a definite layer structure within the bed itself. The individual fibers within a layer are flat in the plane of the layer, but otherwise randomly oriented.

While the thickness of the catalyst bed does not form a limitation on the present invention, it has been found that thicknesses ranging from ⅛ to ⅜ of an inch and a density of 5 to 8 pounds per cubic foot are characterized by excellent diffusion, and no channels. The efficiency of such beds is markedly increased, producing 2 to 4 times the number of B.t.u. per gram of catalyst over previous beds. This is true by virtue of the more thorough exposure of the catalyst to the reactants as a result of the unique layered structure of this catalyst bed. There is a forced redistribution of the gas within and between each layer as it passes through the bed, thereby getting maximum exposure of the surface of the individual fibers.

Catalyst beds of the type described in the present application have reached temperatures ranging from 1000° to 1200° F. or higher without passing raw gas. Further, they may be diluted with 50% or more inert fiber without demonstrating a noticeable loss of output or efficiency when compared to an undiluted bed of the same size, thickness and weight. The dilution or mixing may take place in the beating operation in the above described machine.

FIGURE 10 illustrates another embodiment of the catalytic heating device of the present invention. This embodiment comprises a cylindrical catalyst bed support 111 which may be made of metal mesh, perforated metal or expanded metal, as illustrated. Annular end pieces 112 and 113 are affixed to the ends of the support 111. The end piece 112 has a flared portion 112a and a peripheral flange 112b. The end piece 113 similarly has a flared portion 113a and a peripheral flange 113b.

In this instance, a diffuser means is provided, comprising a layer 114 of fibrous material felted onto the support 111. The fibrous layer 114 may be made up of the same fibers as the catalyst bed itself, but these fibers are not treated with the catalyst material. The untreated fibers may be placed in the device of FIGURES 8 and 9 and applied to the support 111 as described above. The machine for making the catalyst bed may then be filled with catalyst-treated fibers, and the catalytic bed 115 may be felted directly on the fibrous diffuser layer 114. The diffuser layer 114 and the catalyst-carrying bed 115 are then held in place on the support 111 by a cylindrical retaining means 116 which may be similar in construction to the support means 111.

While it has not been found necessary to do so, it is nevertheless desirable to take precautions to prevent the leakage of raw fuel at the ends of the catalyst bed, and insure that all fuel must pass through the catalyst bed. This may be accomplished in any suitable manner, as for example by compressing the ends of the catalyst bed by means of bands 117 and 118. The bands 117 and 118 may be applied by well known banding devices, or they may comprise rings of spring metal with overlapping ends. When the latter type of banding means is used, the rings are expanded, located in the proper position, and allowed to assume a closed position with their ends overlapping.

The structure of FIGURE 10 has end cap means 119 and 120, affixed to the end pieces 112 and 113 respectively, in air-tight fashion. As illustrated, the caps 119 and 120 may have flared portions 119a and 120a conforming respectively to the flared portions 112a and 113a of the end pieces. The caps 119 and 120 may also serve to support a gas inlet tube 121. As illustrated, the gas inlet tube 121 may pass through perforations 119b and 120b in the caps 119 and 120 and be affixed therein. One end of the gas inlet tube is closed by a plug 122, while the other end is provided with a fitting 123 suitable for connection to conduit means from a fuel source.

Gaseous or vaporized fuel may pass into the chamber 124, formed by the support 111 and the cap means 119 and 120 through perforations 125 in the gas inlet tube 121. The spacing of the holes 125 longitudinally along the gas inlet tube 121 will depend upon a number of factors including the characteristics of the catalyst bed, the length of the bed, the nature of the fuel and the like. For example, if it is found that for a given set of specifications, a bed will tend to be hotter at the midpoint of its length than at its ends, the holes 125 should be spaced further apart at the midpoint of the gas inlet tube than at the ends of the gas inlet tube. In this way, a uniform temperature may be maintained throughout the length of the bed and effusion effects may be overcome. By "effusion effects" is meant the tendency of gases to flow more rapidly through the bed at a greater temperature. Thus, if the catalyst bed is hotter at the center of its length, the fuel gases will tend to flow more rapidly through that portion of the bed. This in turn will cause that portion of the bed to achieve an even greater temperature, resulting in what has been termed "avalanche." Such a condition is, of course, to be avoided, and may be controlled to a large extent by the proper placement of the perforations or holes 125 and the provision of an adequate diffusion layer 114.

FIGURE 11 illustrates a heating device of the type shown in FIGURE 10, provided with a modified form of cap means. Like parts have been given like index numerals. The cap, generally indicated at 126, comprises a flat circular portion 127 with an inwardly extending annular flange 128. As illustrated in FIGURE 11, when the cap 126 is in place, the inside surface of the flat cap portion 127 is adapted to lie against the peripheral flange 113b of the end piece 113. The annular cap flange portion 128 is adapted to overlie the retaining means 116. The cap flange portion 128 is provided with a plurality of perforations 129. Each of the perforations 129 has a deformable tab 130 located adjacent to it. The perforations 129 and tabs 130 may be formed by a simple punching operation. It will be noted from FIGURE 11, that the cap is held in place on the catalyst bed assembly by the inward depression of the tabs 130 so as to cause them to engage the catalyst bed retaining means 116. The perforation-tab arrangement serves an additional purpose, in that it allows oxygen from the surrounding atmosphere to reach that portion of the catalyst bed which is covered by the flange portion 128 of the cap means. Thus uniform and proper combustion will occur in the covered part of the catalyst bed.

Under certain circumstances, it is sometimes desirable to have a catalytic bed which is of a length greater than can be conveniently accommodated in a bed making machine of the type described above. In such an instance, two or more structures of the type shown in FIGURE 10 may be joined together. FIGURE 12 is a fragmentary view illustrating two structures of the type shown in FIGURE 10 in end-to-end relationship, and means for joining them together. Again, like parts have been given like index numerals. In this instance, two catalytic heating devices are placed in end-to-end relationship with their flanges 112b and 113b abutting. The joining means comprises a band, generally indicated at 131, and surrounding the abutting flanges. The band 131 is of such width as to overlie the catalyst bed retaining means 116 of both devices. The band has spaced pairs of holes 129 and tabs 130, identical to those shown in FIGURE 11. The tabs 130 are depressed so as to engage the catalyst bed retaining means of both devices. It will be understood that the perforations 129 and tabs 130 serve the same purpose as described with respect to FIGURE 11.

When catalyst bed assemblies are joined, as described with respect to FIGURE 12, care must be taken to insure the proper distribution of fuel within the structure for the reasons discussed above. Such a multiple structure, for example, may be provided with a gas inlet tube similar to that shown at 121 in FIGURE 10, again care being taken to properly locate the perforations 125 therein. It has been found, on the other hand, that when a catalytic heating device of the type shown in FIGURE 10 is made with a length less than twice its diameter, a gas inlet tube of the type shown in FIGURE 10 is not needed. An open ended inlet tube may be used which extends inwardly of the cap 120 only a short distance.

FIGURES 13 and 14 illustrate an exemplary form of housing and reflector for use with catalytic heating devices of the type shown in FIGURES 10 through 12. The housing is of a substantially triangular cross-section, and comprises three longitudinal walls 132, 133 and 134. These walls terminate in triangular end walls 135 and 136. The longitudinal wall 134 has an elongated rectangular perforation 137 therein, exposing two inner end walls (one of which is shown at 138) and a double parabolic reflector 139. A catalytic heating device is generally indicated in FIGURE 13 at 140. In FIGURE 14, two such elements are shown, joined end to end, with their outermost ends joined to the inner end walls of the casing (one of which is shown at 138). It will be noted that the catalytic heating devices 140 are so located within the housing as to lie in spaced relationship to the line of juncture (generally indicated at 141) of the two parabolas forming the reflector 139. With the use of a double parabolic reflector, and with such a placement of the catalytic heating devices 140, the majority of the heat reflected by the reflector 139 will bypass the catalytic heating devices. In this way, surface portions of the catalytic heating devices will not become over-heated by reflected heat.

The longitudinal walls 132 and 133 may be provided with a plurality of perforations (not shown) to prevent the build up of heat within the housing. The ends 142 and 143 of the housing are hollow, and may contain various control elements as desired. It will be obvious to one skilled in the art, that a housing of the type shown in FIGURES 13 and 14 may be suitably supported by bracket means. The housing may be affixed to a vertical wall of a room or the like, or may be located at the juncture of a vertical wall and a ceiling. Similarly, the housing may be suspended from a ceiling by rods, braces, chains or the like affixed to the housing at, for example, the line of juncture between the longitudinal walls 132 and 133.

FIGURE 15 is a diagrammatic representation of a catalytic heating device of the present invention with attendant apparatus for its automatic control. The catalyst bed assembly is indicated at 144 and may be provided with means for bringing it to a threshold temperature such as the heating coil indicated in dotted lines at 145. The heating coil 145 is connected through a power relay 146 to a thermostatic switch 147. A source of fuel is shown at 148 and is connected to the interior of the catalytic bed assembly by means of the conduit 149. The conduit 149 may contain a throttle valve 150 controlled by a thermostat means 151. The conduit 149 may also contain a solenoid valve 152 connected to the thermostatic switch 147. The conduit 149 may be provided with a bypass 153 about the throttle valve 150. The bypass 153 may, itself, contain a valve 154.

In operation, the coil (connected to a source of electrical current not shown) is actuated to bring the catalyst bed assembly to the threshold temperature of the catalytic reaction. Once this temperature has been reached, the coil will be disconnected through the agency of the thermostatic switch 147 and the power relay 146. This same switch 147 will simultaneously actuate the solenoid valve 152 to cause it to open and allow fuel from the source 148 to enter the catalyst bed assembly. The temperature of the catalyst bed assembly may be regulated by the amount of fuel fed to it. This, in turn, may be regulated by the throttle valve 50 and the thermostatic means 151. The thermstatic means 151 will be so located as to sense the temperature of the catalyst bed assembly (for example, the thermostatic means 151 may be located within the housing illustrated in FIGURES 13 and 14). If the catalyst bed assembly is hotter than the temperature for which the thermostatic means 151 is set, the thermostatic means will cause the throttle valve 150 to close down, limiting the amount of fuel entering the catalyst bed assembly. Similarly, should the bed be at a temperature lower than that for which the thermostatic means 151 is set, the thermostatic means will cause the throttle valve 150 to open, allowing a greater amount of fuel to pass from the source 158 to the catalyst bed assembly 144.

Should it be desired to dispense with the thermostatic control of the catalyst bed, the valve 154 may be opened allowing the fuel from the source 148 to bypass the throttle valve 150, and to flow into the catalyst bed assembly 144 at whatever rate is determined by the valve 154.

FIGURES 16 through 33 relate to another embodiment of the catalytic heating device of the present invention. In this embodiment, the catalyst bed is of arcuate, or semi-cylindrical configuration. FIGURES 16 and 17 illustrate a catalyst bed support generally indicated at 155 and comprising a semi-cylindrical member 156 of metal mesh, perforated metal or expanded metal (as illustrated). The semi-cylindrical member 156 has affixed thereto semicircular end elements 157 and 158, each having peripheral flanges 157a and 158a respectively. In additon, longitudinally extending angle irons 159 and 160 are provided each having one leg affixed to an edge of the member 156 and the end elements 157 and 158, while the other leg of each extends inwardly thereof.

FIGURE 18 illustrates a carrier means for a pair of catalyst bed supports. The carrier means is adapted to hold a pair of catalyst bed supports during the catalyst bed formation. The carrier, generally indicated at 161 comprises a spaced pair of disks 162 and 163, each having a central perforation 164 and 165, respectively. The disks 162 and 163 are joined by a pair of diametrically opposed elongated elements 166 and 167. The element 166 has an E-shaped cross-section so as to provide two spaced, longitudinally extending slots 166a and 166b. The element 167 is similarly configured, providing slots 167a and 167b. A catalyst bed support 155 may be affixed to the carrier 161 by inserting the inwardly extending legs of the angle irons 159 and 160 into slots 166a and 167a respectively. An additional catalyst bed support may be affixed to the carrier by inserting the legs of its angle irons into the slots 166b and 167b.

The assembly of parts for the simultaneous formation of a pair of semi-cylindrical beds is indicated in the exploded view of FIGURE 19. A rotating pipe 168 having a plurality of perforations 169 and a rotating bearing means 170 may be located within the chamber of a bed making machine of the general type shown in FIGURES 8 and 9. A carrier 161 is affixed to the pipe 168 by causing the pipe to pass through the perforations 164 and 165. A pair of catalyst bed retainers 155 are then affixed to the carrier 161 in the manner described above. A retaining disk 171 is placed on the pipe by passing the pipe through the retaining disk perforation 172. Finally, a nut 173 is engaged on the threaded end 174 of the pipe 168. It will be understood that, the nut will be tightened until the carrier 161 is compressed against the bearing 170 by the disk 171. Such an assembly serves the same purpose as the element 97 in FIGURE 8. The forward end 174 of the pipe 168 is closed, and a vacuum may be drawn through the pipe and through the perforations 169 therein. Thus, the pipe 168 not only serves as a support for the carrier and the catalyst bed retainers, but also serves substantially the same purpose as the rotating shafts 83 or 90 in FIGURE 8.

The chamber of the bed making machine is first filled with fibers which have not been treated with the catalyst material. These fibers are air suspended and felted onto the catalyst bed retainers 155 in the same manner as described with respect to FIGURES 8 and 9. In this way, a diffusion layer is felted onto the catalyst bed retainers. The chamber of the machine is then filled with a second load of fibers, similar to those used to form the diffusion layer, but impregnated with the catalyst material. A catalyst bed is then air felted on top of the diffusion layer, again in the same manner as described with respect to FIGURES 8 and 9.

FIGURE 20 is a fragmentary cross-sectional view showing two catalyst bed retaining means 155 affixed to a carrier 161. The figure also shows the assembly with a diffusion layer 175 and a catalyst bed 176 deposited thereon. It will be understood by one skilled in the art, that as the diffusion layer 175 and the catalyst bed 176 are air felted onto the pair of catalyst bed supports, a continuous cylindrical diffusion layer and a continuous cylindrical catalyst bed will be formed. In order that two separate beds may be obtained, the continuous bed must be cut along the element 166 of the carrier in the direction and at the point indicated by the arrow C. A second cut, diametrically opposed to the first cut, must be made along the carrier element 167.

Each of the beds are then provided with a catalyst retaining means 177. As is more clearly seen in FIGURES 21 and 23, the catalyst retaining means comprises a semi-cylindrical element of perforated metal, metal mesh, or expanded metal (as shown) having longitudinal inturned flanges 178 and 179.

Figure 23:
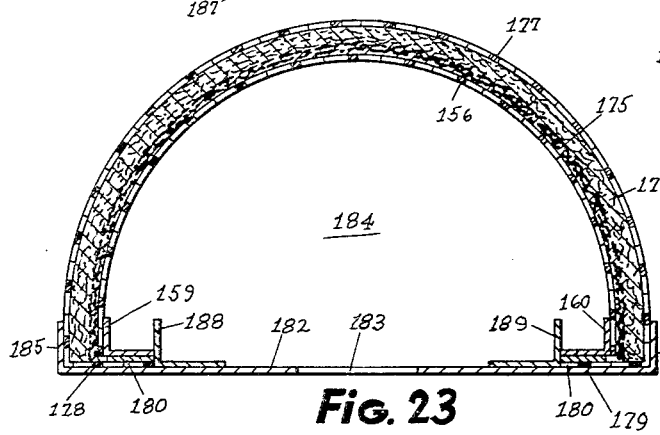
FIGURE 23 is a cross-sectional view of a catalyst bed and base assembly.

It is preferable to perform the cutting operation and to apply the catalyst retainers 177 while the carrier 161 still remains affixed to the pipe 168 and while a vacuum is still being drawn through the catalyst bed. In this way, a uniformly compact catalyst bed is achieved. The flanges 178 and 179 of the catalyst retaining means 177 are inserted in the longitudinal slots of the elements 166 and 167 as illustrated in FIGURE 21. While a portion of the excess bed will be carried down between the catalyst retainer flanges and the inwardly extending lugs of the angle irons 159 and 160, further insurance against leakage of fuel at these points may be achieved by inserting strips of asbestos or the like between the angle irons and flanges. Such strips are illustrated in FIGURES 21 and 23 at 180. Once the catalyst retaining means 177 has been properly positioned, the two catalyst bed assemblies may be removed from the carrier 161.

Figure 22:
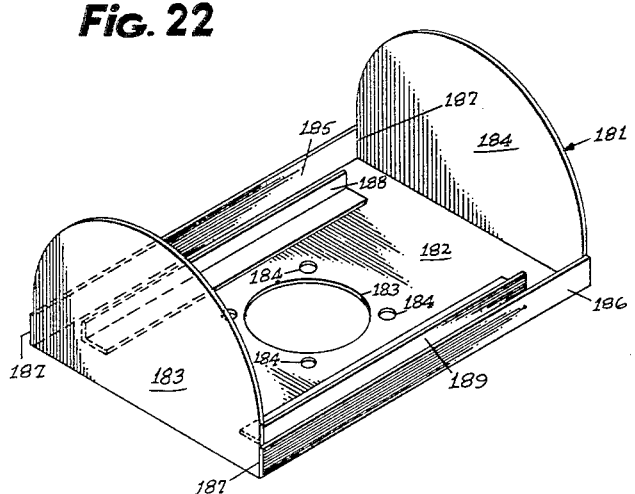
FIGURE 22 is a perspective view of a base for the catalyst bed.

FIGURE 22 is a perspective view of a base member for the catalyst bed. The base member, generally indicated at 181 has a flat bottom portion 182 provided with a large central perforation 183 and a plurality of smaller perforations 184. The base member also comprises substantially semi-circular, upstanding end portions 183 and 184, and upstanding side elements 185 and 186. The end elements 183 and 184 and the side elements 185 and 186 may be integral with the bottom 182. The end elements and side elements may be welded together where they meet, as at 187. A pair of angle irons 188 and 189 are affixed (as by welding or the like) to the bottom 182 in spaced relationship to the side elements 185 and 186 respectively.

FIGURE 23 is a cross-sectional view of the catalyst bed assembly including the base member. It will be noted that the longitudinal edges of the catalyst bed assembly are adapted to lie between the side elements 185 and 186 of the base member and the base member angle irons 188 and 189. Such an assembly insures that there will be no leakage of raw fuel through the longitudinal edges on the catalyst bed assembly.

Figure 24:
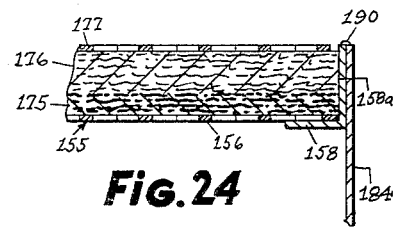
FIGURE 24 is a fragmentary cross-sectional view of an edge of a catalyst bed and the end portion of a base therefor.

FIGURE 24 is a fragmentary view showing the end of the catalyst bed assembly and an adjacent end of the base member. It will be noted that the upstanding flange 158a of the member 158 (constituting a portion of the catalyst bed support 155) abuts the end 184 of the base member. To insure that there will be no fuel leakage between these elements, they are welded as at 190 throughout the length of their adjacent edges. It will be understood that the other end of the catalyst bed and the other end of the base member will be similarly welded.

Figure 25:
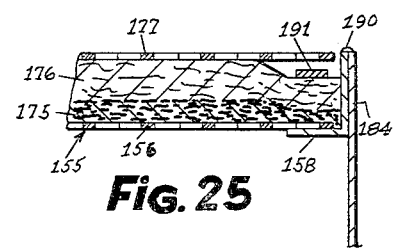
FIGURE 25 is a fragmentary cross-sectional view similar to FIGURE 24 and illustrating the use of a band.

While it has not been found necessary, additional precautions may be taken to prevent leakage of raw fuel through the end of the catalyst bed. FIGURE 25 is similar to FIGURE 24 and like parts have been given like index numerals. FIGURE 25 illustrates the use of a band clamp 191 to compress the end of the catalyst bed in substantially the same way as described with respect to FIGURE 11 above.

Figure 26:
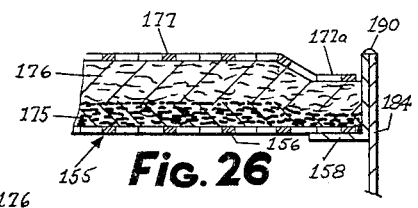
FIGURE 26 is a fragmentary cross-sectional view similar to FIGURE 24 illustrating an upset edge portion of the catalyst retaining means.

FIGURE 26 is similar to FIGURE 25 and like parts have been given like index numerals. This figure illustrates the depression of an end portion 177a of the catalyst bed retainer 177 to perform the same function as the band 191 in FIGURE 25.

Figure 31:
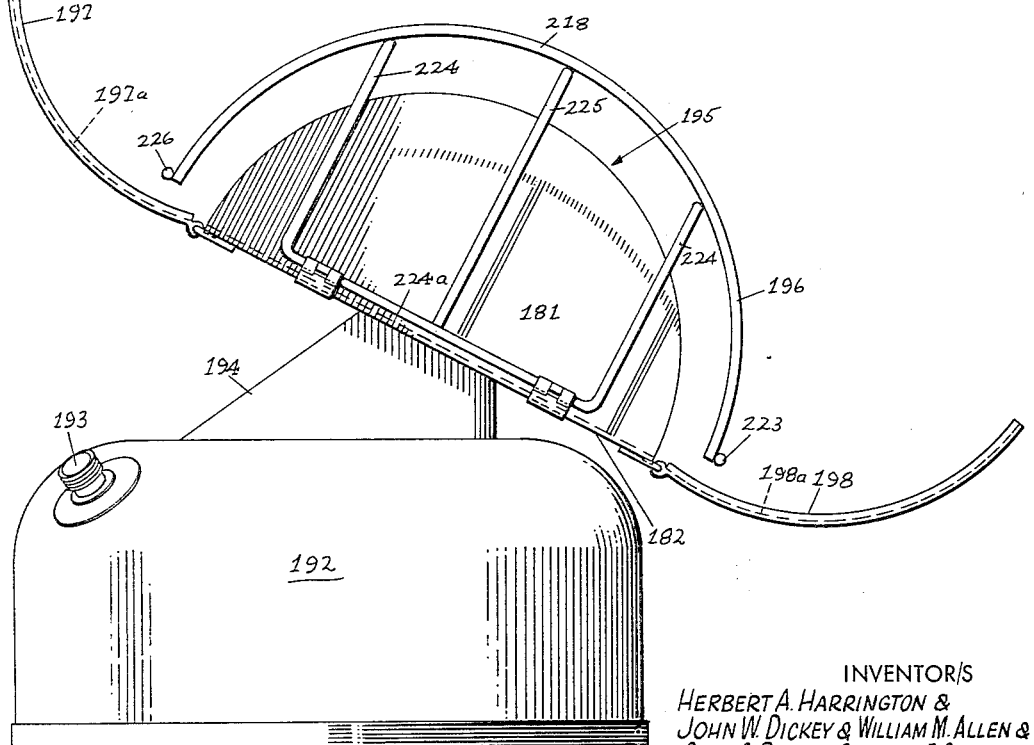
FIGURES 31 and 32 are respectively side and rear elevational views of an embodiment of the catalytic heating device of the present invention.

FIGURE 31 shows the entire catalytic heater assembly. The assembly comprises a fuel retaining can 192 with a cappable fuel intake opening 193. The can 192 is provided with a neck 194 which, in turn, supports the catalyst bed and base member assembly, generally indicated at 195. To the bottom 182 of the catalyst base member 181 there is hingedly affixed a guard 196 and a pair of reflector-snuffer elements 197 and 198, all as will be more fully described hereinafter.

Figure 30:
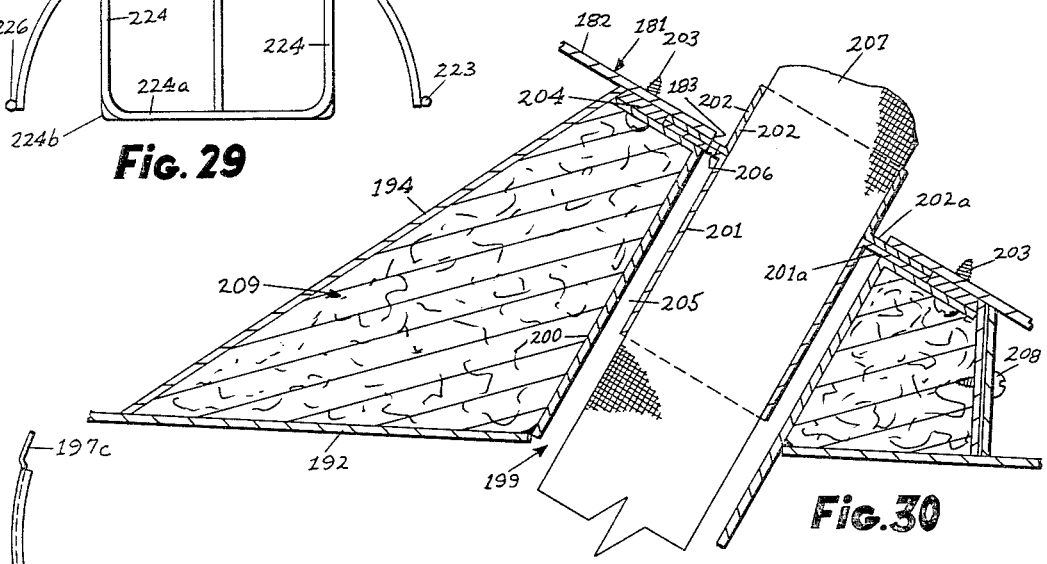
FIGURE 30 is a fragmentary cross-sectional view of the catalytic heating device of FIGURE 31.

FIGURE 30 is a fragmentary cross sectional view of the catalytic heater in the general area of the neck portion 194. The top of the can 192 has a perforation generally indicated at 199. In this perforation there is affixed a sleeve 200 having an annular flange 200a. The sleeve may be affixed to the can 192 as by welding or the like to insure that there will be no leakage of vaporized fuel at the juncture of the can and the sleeve.

The flange 200a of the sleeve 200 supports a wick retaining collar. In the embodiment shown, the collar is illustrated as made up of two pieces 201 and 202 having, respectively, cooperating flanges 201a and 202a resting on the sleeve flange 200a. It will be understood by one skilled in the art that the collar 201–202 may be a one piece structure. The collar flanges are, in turn, surmounted by the bottom 182 of the catalyst bed assembly base member 181. The upper portion 202 of the wick retaining collar extends through the base member perforation 183. The entire assembly is held together by suitable means such as sheet metal screws 203 passing through the perforations 184 in the catalyst bed assembly base member and perforations in the flange 200a of the sleeve 200. The screws 203 are also caused to pass through an annular gasket means 204 which not only seals the assembly, but also serves to properly locate the wick retaining collar on the flange 200a.

It will be noted that the sleeve 200 is affixed to the can 192 at an angle. While such a construction is not necessary, it has been found desirable, so that the catalyst bed assembly 195 will be oriented at an angle of approximately 30° to the horizontal. In this way, heat from the catalyst bed may be easily and accurately directed.

It will be noted that the wick retaining collar 201–202 is so dimensioned with respect to the sleeve 200 that an annular passage 205 is formed therebetween. In addition, one or two perforations 206 are provided in the flange of the collar 201–202 so that communication is established between the annular passage 205 and the interior of the catalyst bed and base member assembly. Such communication permits a better and more efficient operation of the heating device.

The collar 201–202 supports and retains a wick element 207. The wick 207 may be retained in the collar frictionally, or it may be retained by an upset portion of the collar or a screw through the collar (not shown). The nature of the wick does not constitute a limitation on the present invention. A wick of glass wool retained in a woven cylindrical sheath of suitable material has been found satisfactory. The wick will extend downwardly to the bottom of the can 192 and will extend upwardly into the catalyst bed and base member assembly.

As indicated in FIGURE 30, the structure just described is surrounded by a neck element 194. This neck element may be made of sheet metal or the like, and is shaped in such a way as to be capable of being wrapped around the assembly. The ends of the neck element 194 are overlapped and secured together by suitable means such as a sheet metal screw 208. The annular space between the neck element 194 and the sleeve 200 may be filled with insulation (generally indicated at 209) to prevent heat loss about the sleeve 200. The neck element 194 not only serves a decorative purpose, but also serves as additional support for the catalyst bed and base member assembly.

Figure 32:
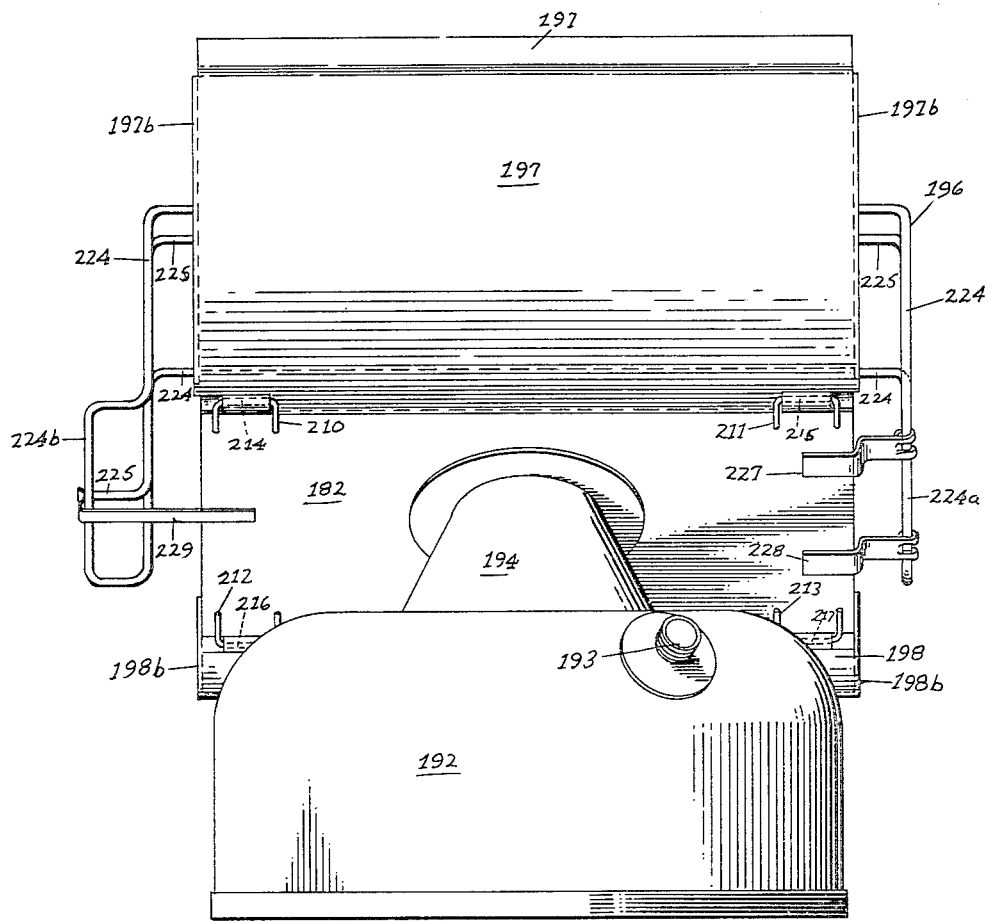
Figure 33:
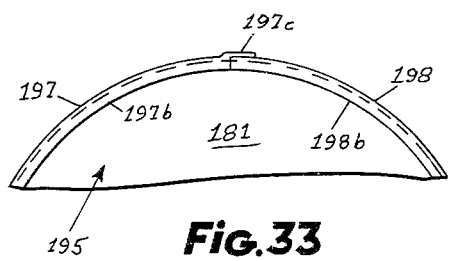
FIGURE 33 is a fragmentary side elevation of the catalytic heating device of FIGURES 31 and 32 illustrating the reflector-snuffer means in closed position.

FIGURES 31 through 33 illustrate reflector-snuffer elements 197 and 198 hingedly affixed to the bottom 182 of the catalyst bed and base member assembly. The elements 197 and 198 are arcuate, and are adapted to conform to the exterior shape of the catalyst bed and base member assembly 195. The hinged attachment to the base member bottom 182 may be accomplished in any suitable manner. For purpose of an exemplary showing, the base member bottom 182 is shown as having affixed thereto (by welding or the like) a series of U-shaped elements 210 through 213, made of heavy wire or rod stock. The U-shaped elements 210 and 211 are engaged by hinge tabs 214 and 215 respectively, which may be integral with the reflector-snuffer element 197. Similarly, the U-shaped elements 212 and 213 are engaged by hinged tabs 216 and 217 respectively, which may be integral with the reflector-snuffer element 198. FIGURES 31 and 32 show the reflector-snuffer elements 197 and 198 in open position. The bottom edges of these reflector-snuffer elements may cooperate with the base bottom 182 in such a way as to serve as stop means to determine the open position. The element 197 has a polished inner surface 197a, serving as a reflector. The element 198 has a similar polished inner surface 198a.

FIGURE 33 shows the reflector-snuffer elements 197 and 198 in closed position. The element 197 has downwardly depending edges 197b which are adapted to overlie the ends of the catalyst base member 181. The element 198 is provided with similar depending edges 198b. In addition, the element 197 has a longitudinal flange 197c adapted to overlie the longitudinal upper edge of the element 198. Thus, the reflector-snuffer elements 197 and 198 are constructed as to comprise a substantially air-tight closure for the catalyst bed. The depending edges 197b and 198b, and the longitudinal flange 197c also serve (particularly when the catalyst bed is tilted as shown in FIGURES 31 and 32) to protect the bed from moisture and foreign material.

The catalytic heater may also be provided with a guard, serving to protect the bed while in use, and to protect the user from accidental contact with the bed. While the guard may be of any suitable configuration and construction, for purposes of an exemplary showing it is illustrated as made of heavy wire or rod stock elements suitably joined together by welding or the like.

Figure 27:
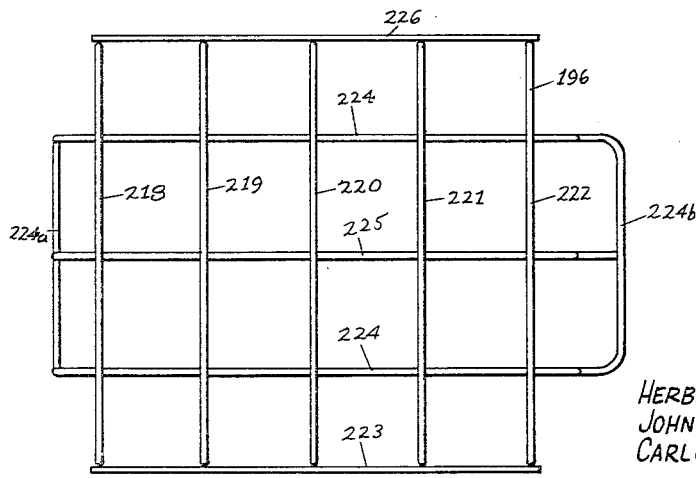
FIGURES 27, 28 and 29 are respectively plan, side elevation and end elevation views of a guard for the catalytic heating device of FIGURES 31 and 32.
Figure 28:
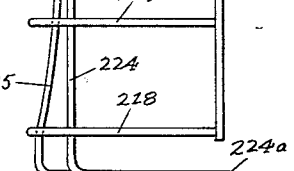
Figure 29:
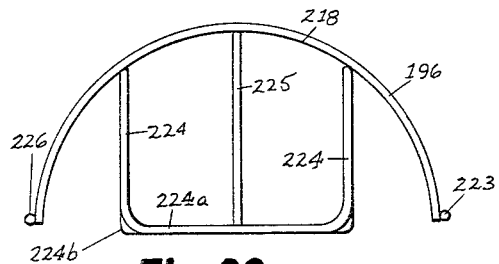

FIGURES 27 through 29 illustrate most clearly an exemplary embodiment of the guard 196. Basically, the guard comprises a plurality of arcuate members 218 through 222, held in spaced relationship by longitudinally extending members 223 through 226. It will be noted that the longitudinal members 224 and 225 depend downwardly at the guard ends. The member 224 is a continuous piece and has two horizontal portions 224a and 224b.

As illustrated in FIGURES 31 and 32, the guard 196 is hingedly affixed to the catalyst bed and base member assembly by means of hinge tabs 227 and 228. The hinge tabs 227 and 228 are affixed at one end to the bottom 182 of the base member 181. The outermost ends of the hinge tabs engage the horizontal portion 224a of the guard.

The horizontal guard portion 224b is slightly outturned, and is adapted to serve as a hand grip for manipulating the guard. The guard may be latched in its closed position by means of a spring clip 229. One end of the spring clip 229 is affixed to the bottom 182 of the base member 181. The other end of the spring clip is adapted to releasably engage the horizontal guard portion 224b.

The operation of the catalytic heater of FIGURES 31 and 32 may be described as follows. The can 192 is filled with a suitable fuel through opening 193. The type of fuel does not constitute a limitation on the present invention. Excellent results have been achieved with a light cut of naphtha or alcohol. The guard is next released from the spring clip 229 and swung upwardly and to the side of the catalytic heater, out of the way. The reflector-snuffer elements 197 and 198 are then moved to their open position. A small quantity of fuel is then poured evenly onto the catalyst bed. The guard may then be returned to its latched position.

The catalyst bed may then be directly ignited by means of a match or the like. The fuel, poured on the bed, will burn to bring the bed to the threshold temperature of the catalytic reaction. When the fuel poured on the bed is consumed, flaming combustion will stop and flameless combustion will continue. Fuel from the can 192 will be drawn up the wick 207 and be caused to vaporize within the catalyst bed and base member assembly. The vaporized fuel will then pass through the catalyst bed to bring about the above mentioned catalytic reaction.

To shut off the heating device, it is merely necessary to move the guard 106 to its unlatched and remote position. The reflector-snuffer element 198 may then be returned to its closed position followed by the return of the reflector-snuffer element 197 to its closed position. Since these elements make a substantially air-tight closure for the catalyst bed, and since oxygen from the surrounding atmosphere can no longer reach the bed, the catalytic reaction will cease.

Once the reflector-snuffer elements are in closed position, the guard may again be returned to its latched position. It will be noted in FIGURE 28 that the central longitudinal member 225 of the guard is depressed inwardly. This enables the member 225 to contact the longitudinal flange 197c of the reflector-snuffer element 197 so as to hold the elements 197 and 198 securely in closed, snuffing position.

It will be understood by one skilled in the art that the catalytic heating device of FIGURES 31 and 32 may be provided with any suitable type of carrying means or handle (not shown). For example, the device may be provided with a bail-type carrying means which may be pivotally affixed to the can 192, the guard 196, or the end portions 183 and 184 of the catalyst base member 181.

It will further be understood by one skilled in the art that a catalyst bed and base member assembly of the type shown in FIGURE 23 may be equally well used with a source of gaseous fuel. For example, a suitable gas distributing element may extend within the catalyst bed and base member assembly through the perforation 183.

The catalyst bed described with respect to FIGURES 16 through 33 need not be restricted to a semi-cylindrical configuration. The bed may have any arcuate configuration with a cross section of less than 360°. For example, FIGURE 18a shows a carrier generally indicated at 230. The carrier 230 is in every way equivalent to the carrier shown in FIGURE 18 except that the disks 232 are held in spaced relationship by three longitudinally grooved elements 233 through 235. The method of making catalyst beds on the carrier of FIGURE 18a is identical to that described with respect to FIGURES 16 through 26. The only difference lies in the fact that three beds will be made simultaneously, using a catalyst bed carrier and a catalyst retaining means similar to those shown in FIGURES 20 and 21, but having an arcuate cross-sectional configuration of substantially 120°. From this it will be understood that beds of any suitable arcuate cross section can be made by providing a carrier of the proper cross sectional configuration and with the proper number of properly placed longitudinally grooved elements.

Catalytic heating devices of the type shown in FIGURES 31 and 32 have been found to be characterized by remarkable efficiency. They have further been found to be capable of more than 6,000 B.t.u. per hour, for a catalyst bed surface of 72 square inches, without passing measurable amounts of unburned fuel or carbon monoxide.

Modifications may be made in the present invention without departing from the spirit of it. For example, cylindrical heating units of the type shown in FIGURES 1 through 4 may be made of any desired length and may be provided with trough-like reflectors rather than parabolic or conical reflectors. The various catalytic heating devices of the present application may be made in the form of portable units or stationary fixtures. It is also possible to provide units of the type described with or without a heating element. Preheating may be accomplished by a brief period of open flame combustion of the fuel on the outer surface of the catalyst bed.

It will be obvious to one skilled in the art that the fibrous catalytic beds above described with respect to apparatus for catalytic heaters may also be used with corresponding advantages in other catalytic reactions.

The invention having been described in certain exemplary embodiments, what is claimed as new and desired to be secured by Letters Patent is:

The embodiments of the invention in which an exclusive property or privilege is claimed are defined as follows:

1. An apparatus for the catalytic combustion of gaseous and vaporizable fuels comprising a catalyst bed, a porous diffuser means adjacent one side of said bed, a catalyst retaining means adjacent the other side of said bed, and means for passing said fuel in gaseous state through said diffuser means into said bed, said catalyst bed being air felted from catalyst bearing fibers, said catalyst bearing fibers being arranged in uniform clinging layers within said catalyst bed, the catalyst bearing fibers in each of said layers being randomly oriented in the plane of their respective layer.

2. The structure claimed in claim 1 wherein said catalyst retaining means, said air felted catalyst bed and said porous diffuser means form a cylindrical assembly, said diffuser means comprising the inner surface and said retaining means comprising the outer surface of said cylindrical assembly, means at both ends of said cylindrical assembly forming gas tight closures for said ends, and said means for passing said fuel in gaseous state through said diffuser means into said bed being located within said cylindrical assembly.

3. The structure claimed in claim 1 including a foraminous support means on the side of said diffuser means opposite said catalyst bed, said support means, diffuser means, catalyst bed and retaining means forming a cylindrical assembly, said support means comprising the inner surface and said retaining means comprising the outer surface of said cylindrical assembly, means at both ends of said cylindrical assembly forming gas tight closures for said ends, and said means for passing said fuel in gaseous state through said diffuser means into said bed being located within said cylindrical assembly.

4. The structure claimed in claim 1 including a flat rectangular support means, upturned edge members on said support means, a central depression in said support means, said diffuser means lying within said upturned edges above the inside surface of said support means, said catalyst bed lying within said edges adjacent said diffuser means, said retaining means lying within said edges adjacent said catalyst bed, means for holding said diffuser means, catalyst bed and retaining means in place, said means for passing said fuel in gaseous state through said diffuser means into said bed being located between said inside surface of said support and said diffuser means.

5. The structure claimed in claim 1 including a foraminous support means on the side of said diffuser means opposite said catalyst bed, said support means, diffuser means, catalyst bed and retaining means forming an assembly having an arcuate configuration with arcuate end edges and rectilinear side edges, said support means comprising the inner surface and said retaining means comprising the outer surface of said arcuate assembly.

6. The structure claimed in claim 2 including means for preheating said bed to the threshold temperature of said catalytic reaction, said preheating means being located within said cylindrical assembly.

7. The structure claimed in claim 2 including a reflector partially surrounding said cylindrical assembly.

8. The structure claimed in claim 2 wherein a cylindrical can is placed within said cylindrical assembly, said can having one of its ends closed and the other end open, said open end enclosed by one of said closure means, said closed end spaced from said other closure means forming a gaseous fuel chamber, means located within said gaseous fuel chamber for conveying said fuel in gaseous state thereto, and means for conveying said gaseous fuel from said fuel chamber to substantially the entire area of said diffuser means between said diffuser means and said can.

9. The structure claimed in claim 3 including means for preheating said bed to the threshold temperature of said catalytic reaction, said preheating means being located within said cylindrical assembly.

10. The structure claimed in claim 3 including a reflector partially surrounding said cylindrical assembly.

11. The structure claimed in claim 3 wherein said diffuser means comprises an air felted, fibrous bed.

12. The structure claimed in claim 3 wherein said fuel passing means comprises a conduit passing through at least one of said closure means, said conduit lying within and extending the length of said cylindrical assembly, said conduit having a plurality of fuel emitting perforations along its length.

13. The structure claimed in claim 3 including a second cylindrical assembly, said two cylindrical assemblies joined in end-to-end relationship forming a multiple assembly, said closure means located at the ends of said multiple assembly, said fuel passing means located within said multiple assembly.

14. The structure claimed in claim 3 including band means for preventing the passage of fuel through edge portions of said bed and diffuser means, said band means surrounding said bed and diffuser means adjacent their edge portions, and compressing said edge portions about said support.

15. The structure claimed in claim 4 including means for preheating said bed to the threshold temperature of said catalytic reaction, said preheating means being affixed to the outside surface of said support.

16. The structure claimed in claim 5 wherein said arcuate assembly comprises one wall of a fuel receiving chamber.

17. The structure claimed in claim 8 including means for preheating said bed to the threshold temperature of said catalytic reaction, said preheating means being located within said cylindrical can.

18. The structure claimed in claim 16 wherein said diffuser means comprises an air felted, fibrous bed.

19. The structure claimed in claim 18 wherein said chamber has a bottom wall, said bottom wall having a perforation therein, a container for vaporizable fuel, said chamber affixed to said container, said fuel passing means comprising a wick, said wick extending from within said container into said chamber through said perforation.

20. The structure claimed in claim 18 including a pair of arcuate reflector-snuffer means, said reflector-snuffer means being hingedly affixed to said chamber, said reflector-snuffer means having open and closed positions, said reflector-snuffer means comprising reflectors for said arcuate assembly when in said open position, said reflector-snuffer means completely covering said arcuate assembly when in said closed position and comprising snuffer means for said catalyst bed when in said last mentioned position.

21. The structure claimed in claim 19 wherein said chamber is affixed to said container in such a way that said bottom wall of said container lies at an angle to the horizontal.

22. The structure claimed in claim 20 including guard means hingedly affixed to said chamber, said guard means having an open position and a closed position, when in said open position, said guard being out of the range of movement of said reflector-snuffer elements between their open and closed positions, when in said closed position, said guard overlying said arcuate assembly when said reflector-snuffer means are in their open position, when in said closed position, said guard overlying said reflector-snuffer means when in their closed position.

23. The structure claimed in claim 22 wherein said chamber has a bottom wall, said bottom wall having a perforation therein, a container for vaporizable fuel, said chamber affixed to said container, said fuel passing means comprising a wick, said wick extending from within said container into said chamber through said perforation.

24. A catalyst bed assembly for apparatus for catalytic combustion comprising a foraminous support, an air felted, fibrous diffuser bed on said support, the fibers of said diffuser bed being arranged in uniform clinging layers within said diffuser bed, the fibers in each of said layers being randomly oriented in the plane of their respective layer, a catalyst bed on said diffuser bed, said catalyst bed being air felted from catalyst bearing fibers, said catalyst bearing fibers being arranged in uniform clinging layers within said catalyst bed, the catalyst bearing fibers in each of said last mentioned layers being randomly oriented in the plane of their respective layer.

25. The structure claimed in claim 24 including a foraminous bed retaining means surmounting said catalyst bed.

26. The structure claimed in claim 25 wherein said support, diffuser bed, catalyst bed, and retaining means comprise a hollow cylindrical structure, said retaining means comprising the outer surface of said structure and said support comprising the inner surface of said structure.

27. The structure claimed in claim 25 wherein said support, diffuser bed, catalyst bed and retaining means comprise a planar structure.

28. The structure claimed in claim 25 wherein said support, diffuser bed, catalyst bed and retaining means comprise a structure having an arcuate cross section transverse one of its axes, said structure having arcuate end edges and rectilinear side edges, said support forming the inside surface of said structure and said retainer forming the outside surface of said structure.

29. The structure claimed in claim 26 including cap means at the ends of said cylindrical structure, said cylindrical structure and cap means comprising a chamber for the receipt of a gaseous fuel.

30. The structure claimed in claim 27 wherein said planar structure comprises one wall of a chamber for the receipt of a gaseous fuel.

31. The structure claimed in claim 28 wherein said arcuate structure comprises one wall of a chamber for the receipt of a gaseous fuel.

32. The structure claimed in claim 29 including means for preventing said fuel from passing outwardly of the edges of said diffuser and catalyst beds.

33. The structure claimed in claim 30 including means for preventing said fuel from passing outwardly of the edges of said diffuser and catalyst beds.

34. The structure claimed in claim 31 including means for preventing said fuel from passing outwardly of the edges of said diffuser and catalyst beds.

References Cited

UNITED STATES PATENTS

| | | | |
|---|---|---|---|
| 2,993,489 | 7/1961 | Sterick | 126—92 |
| 2,994,916 | 8/1961 | McFadden | 263—19 X |
| 3,029,802 | 4/1962 | Webster. | |
| 3,061,416 | 10/1962 | Kazokas. | |
| 3,189,563 | 6/1965 | Hauel | 252—477 |

EDWARD G. FAVORS, Primary Examiner

U.S. Cl. X.R.

252—477; 431—329